March 15, 1932.    H. KOCH    1,849,984
BATCH WEIGHING AND MIXING MACHINE
Filed June 15, 1931    3 Sheets-Sheet 1
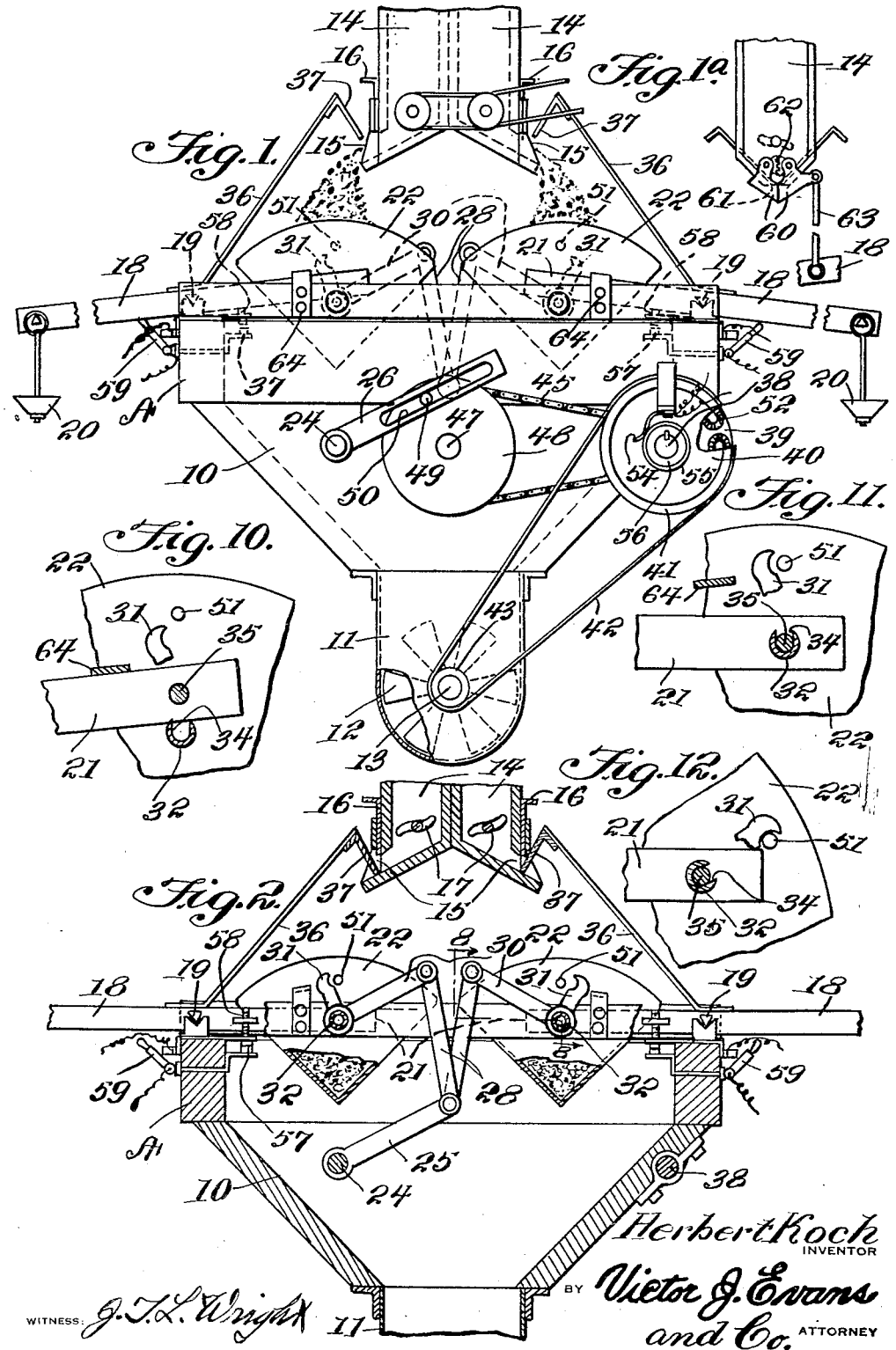

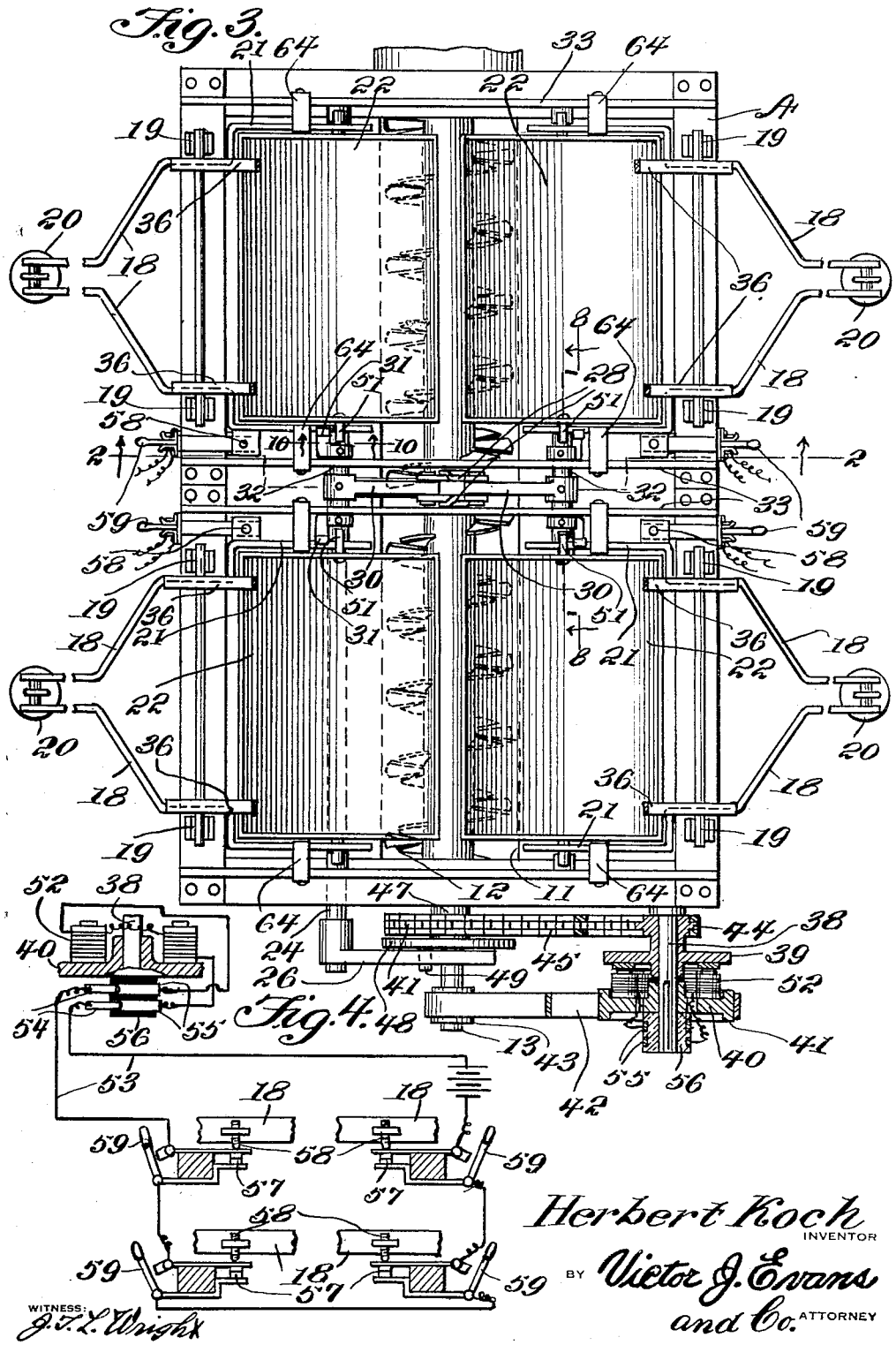

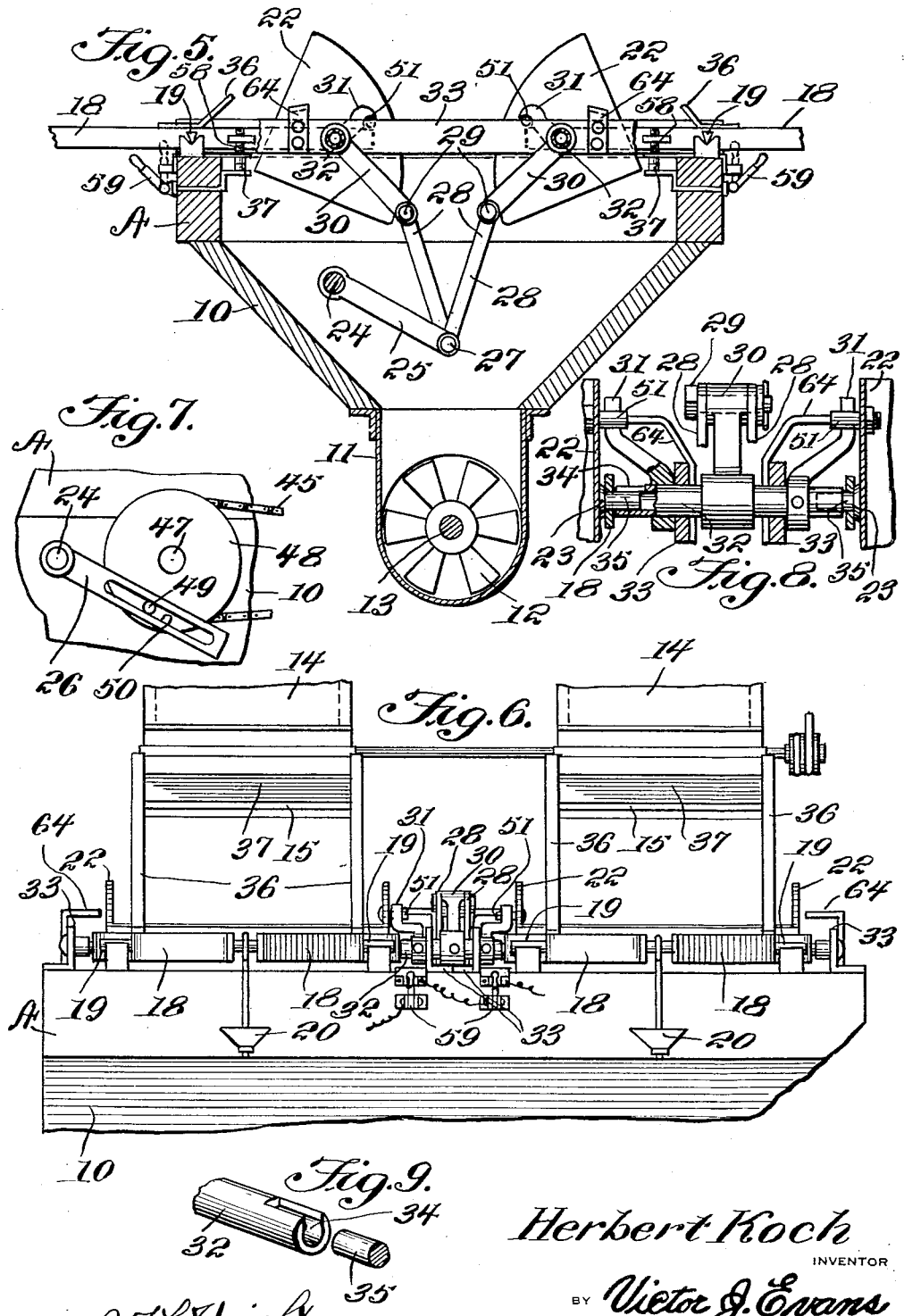

Patented Mar. 15, 1932

1,849,984

UNITED STATES PATENT OFFICE

HERBERT KOCH, OF ATCO, NEW JERSEY

BATCH WEIGHING AND MIXING MACHINE

Application filed June 15, 1931. Serial No. 544,623.

The invention relates to a mixing machine and more especially to a batch weighing and mixing apparatus.

The primary object of the invention is the provision of a machine or apparatus of this character wherein free flowing material such as whole wheat, cracked grains and other granular substances may be accurately blended in predetermined quantities automatically in a single operation.

Another object of the invention is the provision of a machine wherein material can be mixed together in batches of predetermined weights rather than by quantity or through measuring methods, thus accuracy is had of the batches by weight during the mixing operation of the machine or apparatus.

A further object of the invention is the provision of a machine or apparatus of this character, wherein the control for the materials to be mixed together is of novel form and includes weighing mechanism for determining accurately the weight of the materials prior to the mixing thereof and such mixing of the determined batches of material is automatically controlled for the thorough mixing of the weighed batches and the subsequent delivery of the mixture from the machine or apparatus.

A still further object of the invention is the provision of a machine or apparatus of this character, which is thoroughly reliable and efficient in operation, automatic in action, and inexpensive to manufacture and install.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings:—

Figure 1 is an elevation of the machine or apparatus constructed in accordance with the invention, portions thereof being broken away to illustrate certain details.

Figure 1a is a fragmentary elevation of a modified form of feed chute control for the machine or apparatus.

Figure 2 is a vertical section elevation thereof with the parts shifted from normal feed position to load carrying position of the determined batches for mixture thereof, and taken approximately on the line 2—2 of Figure 1 looking in the direction of the arrow.

Figure 3 is a top plan view with the electric clutch in section.

Figure 4 is a diagrammatic plan view of the electric circuit associated with the machine or apparatus.

Figure 5 is a view similar to Figure 2 showing the scale weighing pans in position for delivering their batch or loads.

Figure 6 is a fragmentary side elevation of the machine or apparatus.

Figure 7 is a detail elevation of the rocker lever for controlling the scale weighing pans and in shifted position from that shown in Figure 1 or when the pans are in unloading or discharging position.

Figure 8 is a fragmentary sectional view on the line 8—8 of Figure 2 with portions broken away.

Figure 9 is a fragmentary perspective view of the latching arrangement for each scale beam of the machine or apparatus.

Figure 10 is a fragmentary detail sectional view on the line 10—10 of Figure 3 looking in the direction of the arrow.

Figure 11 is a view similar to Figure 10 showing the parts in a shifted position.

Figure 12 is a view similar to Figure 11 showing a further shifted position of the parts.

Similar reference characters indicate corresponding parts throughout the several views in the drawings.

Referring to the drawings in detail, the machine or apparatus comprises a supporting frame A mounted stationarily in any manner and beneath which is suspended dual mixers each in the form of a hopper-like casing 10 communicating at its lower end with a discharge conveyor housing 11 in which is arranged a spiral discharging or delivering conveyor 12, the housing 11 being common to the pair of mixers. The shaft 13 of the spiral conveyor 12 is journaled in the housing 11 in any suitable manner and constitutes the power shaft of the machine or apparatus.

Above the supporting frame A centrally with relation to the mixers 10 are vertically disposed feed chutes 14 having in their lower ends laterally directed openings 15 through which materials therefrom are delivered to the mixers. These openings 15 can be regulated as to size by manually adjustable shutter-like valves 16 mounted on the chutes 14 in any suitable manner.

Working within the discharge end portions of the chutes 14 are agitators 17, the same being operable in unison in any desirable manner so as to avoid the choking of the discharge end portions of the chute 14 and to quicken the discharge of material therefrom.

Arranged over the respective mixers 10 supported by the frame A are oppositely located weighing scale beams 18 having rocking movement at the fulcrum knife bearings 19, the outer ends of the beams being fitted with weight hangers or carriers 20 while in the forked inner ends 21 of these beams are swingingly fitted weighing pans 22, the pivotal connection 23 of each pan being located near the upper open end of said pan so that the latter will gravitate to load or receiving position and be normally maintained in such position.

Journaled in the mixers 10 at opposite ends thereof are rocking shafts 24 on opposite ends of each of which are fixed rocking levers 25 and 26. Each lever 25 has pivoted thereto at 27 a pair of links 28, these being pivoted at 29 to the throw arms 30 of dumping jaws 31, the latter being fixed to a rocking axle 32 which has also fixed thereto the arms 30, the axle being journaled in supports 33 carried by the frame A between the mixers 10. Each axle 32 has in its outer end latching notches 34 for receiving latching lugs or pins 35 on and projecting from the inner ends of the scale beams 18 when the latter have rocked to balancing position in the operation of the machine or apparatus.

The scale beams 18 have fitted thereon brackets 36 which carry cut-off gates 37 for the discharge openings 15 of the chute 14 and these gates automatically operate to shut off the feed of material from the chute 14 when the pans 22 have received a determined load by weight when the scale beams 18 become balanced.

Journaled on the mixers 10 is a driven shaft 38 supporting loose and fixed clutch members 39 and 40, the latter member being formed with a belt pulley 41 over which is trained a belt 42, the latter being also trained over a pulley 43 fixed to the power shaft 13 so that motion from the latter will be transmitted to the driven shaft 38. The loose clutch member 39 carries a sprocket pinion 44 over which is trained an endless sprocket chain 45, the latter being also trained over a sprocket wheel 46 journaled upon a stud shaft 47 and this gear 46 is joined with an eccentric 48, the wrist pin 49 of which engages in a slot 50 in the lever 26 so that when the eccentric wheel 47 is rotated the lever 26 will be rocked and synchronizing rocking movement will be imparted to the lever 25, which through the links 28 will actuate the dumping jaws 31 for dumping action of the pans 22 when a determined weighed load is in each of the same in a manner presently described.

The pans 22 are provided with jaw striking pins 51 which are adapted to be engaged by the jaws 31 when the stud pins 51 reach the path of swinging movement of the said jaws and this path is reached when the scale beams 18 have become balanced to assume a horizontal plane.

The clutch member 40 carries electric magnets 52, these being arranged in an electric circuit including the wires 53, the circuit being completed to the magnets 52 through the medium of wipers 54 and contact bands 55 on the hub 56 of said clutch member 40, these electric magnets 52 when energized will attract and hold the clutch member 39 with the clutch member 40 so that power from the shaft 13 will be imparted to the shaft 24 for rocking the levers 25 and 26 for the dumping operation of the pans 22 on the scale beams 18 of the machine or apparatus.

Mounted on the frame A are normally open switches 57, these being included in the electric circuit having the wires 53 and such switches are controlled by closing elements 58 on the scale beams 18, it being apparent that when the scale beams are not at balanced position the switches 57 will be open and when at balanced position the said switches will be closed, thus controlling the circuit to the electric magnets 52 whereby motion can be imparted from the power shaft 13 to the rocking shaft 24 having the arms 25 and 26 thereon, the motion being carried through the loose clutch member 39 when attracted by the magnets 52, the pinion 44, sprocket chain 45, sprocket 46 and eccentric wheel 48 operating the lever 26.

Arranged at the switches 57 are knife switches 59 which are manually operated and when closed will bridge the circuit by any one of the normally open switches 57 and in this manner selectively eliminating weighing operation of any one of the scale beams 18.

In Figure 1a there is shown a modified form of shut-off gate valve control for each chute 14 and includes a pair of pivotally mounted closure gates 60, these being designed to close the discharge opening 61 of the chute and open and close in unison through the medium of meshing toothed sectors 62 carried by said gate. One of the pair of gates 60 has link connections 63 with the scale beams 18 at or near the inner end thereof, thus it being seen that when the beam is brought to balancing position the pair of gates 60 will be automatically closed for shutting off the discharge of material from the chute 14.

In the operation of the machine or apparatus it is to be assumed that the gate valves 37 are in the position as shown in Figure 1 of the drawings, namely, open position and that all of the hand knife switches are open and also the switches 57 are open so that the power from the shaft 13 is shut off to the rocking shaft 24 as the electric magnets 52 are deenergized and the clutch members 39 and 40 separated. The materials of different qualities in the chutes 14 are free to flow into the scale pans 22, the scale beams being normally raised at their inner ends by weights, a predetermined weight having been placed upon the weight carriers 20 accordingly to the desired weight for the loads to be received by the pans 22. Now when the materials flow into the pans 22 and the weights thereon synchronize with the weights of the carriers 20 of the scale beams 18, the latter will be brought to balancing position and when this condition is reached the switches 57 will be closed completing the electric circuit through the wires 53 to the electric magnets 52 energizing the same to contract the clutch member 39 for the clutch engagement with the member 41 so that motion will be transmitted from the shaft 13 to the rocking shaft 24. The pans 22 will have been lowered by the balancing of the scale beams 18 bringing the latching pins 35 into the latching notches 34 in the axles 32 and also the abutment lugs 51 will have moved into the path of the dumping jaws 31. These jaws 31 will advance against the pins 51 and simultaneously therewith the pins 35 will be latched in the notches 34, the advancing of the jaws 31 being effected by the arms 30 acted upon through the links 28 and the rocking levers 35, corresponding synchronizing rocking action therewith being had to the lever 26 under the action of the wrist pin 49 on the eccentric wheel 48 which is driven by the chain 45 from the clutch members 39 and 40.

The advancement of the jaws 31 and the engagement thereof with the pins 51 causes the dumping of the loads in the pans 22 into the mixers 10 whence the material mixed therein will be acted upon by the delivering conveyor 12 for the delivery of the mixed material from the machine to any desired point of deposit.

The dumping pans 22 will be maintained in dumping position until the scale beams 18 have been released by the latching pins 35 from the latching notches 34 in the axles 32, the notches 34 being radially disposed to open through one point of the shaft when such notches are in perpendicular position opening upwardly they will receive the pin 35 and the latter will be retained latched in the notches 34 when the latter turn from perpendicular upwardly opening position whereby the scale beams 18 in balancing position will be maintained in such position until the loads of the pans 22 have been discharged and the notches 34 returned to upward opening perpendicular position whence the scale beams 18 will be freed for rocking movement to tilt with their inner ends elevated under the weight in the carriers 20 of said beam.

It may be found desirable to selectively eliminate the weighing of one or more of the several materials in the hoppers 14 and thus have the scale beams 18 confronting these passive and in this event the operator selectively closes the particular knife switches 59 for bridging the electric circuit through the wires 53 over those inactive switches 57 which are automatically operated by the scale beams 18 and normally open, thereby rendering such scale beams 18 inactive as selectively cut out by the attendant of the machine or apparatus. The switches 59 are arranged upon the frame A in convenient reach of an attendant for the machine.

Mounted on the frame A for limiting the upward swinging movement of the inner ends of the scale beams 18 are stop brackets 64, these being arranged in the path of the upward swinging movement of the said inner ends of the scale beams and thus relieve excessive overbalancing of the latter when the weights for weighing purposes have been placed upon the weight carriers 20 of said beam.

It is of course obvious that by duplicating the machine or apparatus beyond the dual arrangement shown in the drawings the capacity of the same can be increased to any extent desired.

From the foregoing it is thought that the construction and manner of operation of the machine or apparatus will be clearly understood and therefore a more extended explanation has been omitted.

What is claimed is:—

1. A machine of the character described comprising a mixer, batch weighing mechanism associated with the mixer, mechanism for dumping the weighed batch by the weighing mechanism into the mixer, means for delivering material to the weighing mechanism and automatically controlled by the latter, a discharging conveyor in the mixer, driven connections between the discharging conveyor and the dumping mechanism, and electric means controlled by the weighing mechanism to regulate the connections between the conveyor and said dumping mechanism.

2. A machine of the character described comprising a mixer, batch weighing mechanism associated with the mixer, mechanism for dumping the weighed batch by the weighing mechanism into the mixer, means for delivering material to the weighing mechanism and automatically controlled by the latter, a discharging conveyor in the mixer, driven connections between the discharging conveyor and the dumping mechanism, electric means controlled by the weighing mechanism to regulate the connections between the conveyor and said dumping mechanism, and means for rendering the weighing mechanism inoperative.

3. In a machine or apparatus of the kind described, a mixer, means for discharging different materials to the mixer, independently operable scale mechanisms for the respective materials, mechanism for dumping materials weighed by the scale mechansms into the mixer, electromechanical mechanism for operating the dumping mechanism and automatically controlled by the scale mechanism, a conveyor within the mixer, means arranged in the electromechanical mechanism for controlling transmission of power from the conveyor to the dumping mechanism, and manually controlled means for selectively rendering one or more of the scale mechanisms inactive.

4. In a machine or apparatus of the kind described, a mixer, means for discharging different materials to the mixer, independently operable scale mechanisms for the respective materials, mechanism for dumping materials weighed by the scale mechanisms into the mixer, electromechanical mechanism for operating the dumping mechanism and automatically controlled by the scale mechanism, a conveyor within the mixer, means arranged in the electromechanical mechanism for controlling transmission of power from the conveyor to the dumping mechanism, manually controlled means for selectively rendering one or more of the scale mechanisms inactive, and means coacting with the scale mechanisms and the dumping mechanism to maintain the said scale mechanisms inactive when the dumping mechanism is operating.

In testimony whereof I affix my signature.

HERBERT KOCH.